United States Patent
Lepaksha et al.

(10) Patent No.: US 12,405,792 B2
(45) Date of Patent: Sep. 2, 2025

(54) PROCESSING UNIT INCLUDING A DYNAMICALLY ALLOCATABLE VECTOR REGISTER FILE FOR NON-VECTOR INSTRUCTION PROCESSING

(71) Applicant: QUALCOMM Incorporated, San Diego, CA (US)

(72) Inventors: Hithesh Hassan Lepaksha, Hyderabad (IN); Darshan Kumar Nandanwar, Bangalore (IN); Sagar Bamashetti, Chadchan (IN)

(73) Assignee: QUALCOMM Incorporated, San Diego, CA (US)

( * ) Notice: Subject to any disclaimer, the term of this patent is extended or adjusted under 35 U.S.C. 154(b) by 106 days.

(21) Appl. No.: 18/475,320

(22) Filed: Sep. 27, 2023

(65) Prior Publication Data
US 2025/0103335 A1    Mar. 27, 2025

(51) Int. Cl.
*G06F 9/30*    (2018.01)

(52) U.S. Cl.
CPC ........ *G06F 9/3013* (2013.01); *G06F 9/30036* (2013.01)

(58) Field of Classification Search
CPC ............................ G06F 9/3013; G06F 9/30036
See application file for complete search history.

(56) References Cited

U.S. PATENT DOCUMENTS

2004/0015682 A1    1/2004  Barlow et al.
2013/0073838 A1*   3/2013  Gschwind ........... G06F 9/30025
                                                      712/226

OTHER PUBLICATIONS

Lazo, C.R. et al., "Adaptable Register File Organization for Vector Processors," arXiv:2111.05301v2 [cs.AR], May 29, 2022, 13 pages.
International Search Report and Written Opinion for International Patent Application No. PCT/US2024/042129, mailed Nov. 26, 2024, 13 pages.

* cited by examiner

*Primary Examiner* — Zachary K Huson
(74) *Attorney, Agent, or Firm* — W&T

(57) ABSTRACT

A processing unit including a dynamically allocatable vector register file for non-vector instruction processing is disclosed. The processing unit includes an integer execution circuit and integer register file for processing integer instructions. The processing unit also includes a vector execution circuit and a vector register file for processing vector instructions. The integer and vector register files are each sized at design time. A processing unit may be called upon to execute varying workloads that vary between integer and vector operations. Rather than statically dedicating the entire vector register file to vector registers, the processor is configured to dynamically allocate a portion(s) of the vector registers in the vector register file for use in the execution of integer instructions.

19 Claims, 5 Drawing Sheets

PROCESSING UNIT INCLUDING A DYNAMICALLY ALLOCATABLE VECTOR REGISTER FILE FOR NON-VECTOR INSTRUCTION PROCESSING

BACKGROUND

I. Field of the Disclosure

The technology of the disclosure relates generally to processor pipeline microarchitecture.

II. Background

Microprocessors, also known as processing units (PUs), perform computational tasks in a wide variety of applications. One type of conventional microprocessor or PU is a central processing unit (CPU). Another type of microprocessor or PU is a dedicated processing unit known as a graphics processing unit (GPU). A GPU is designed with specialized hardware to accelerate the rendering of graphics and video data for display. A GPU may be implemented as an integrated element of a general-purpose CPU or as a discrete hardware element that is separate from the CPU. A PU(s) executes software instructions that instruct a processor to fetch data from a location in memory and to perform one or more processor operations using the fetched data. The result may then be stored in memory.

Modern instruction set architectures (ISAs) for PUs have added advanced multimedia and machine learning/artificial intelligence (ML/AI) instructions that can handle multidimensional data structures. For example, the advanced vector extensions (AVX) to the x86 Intel® instruction set architecture and the scalable vector extension (SVE) and SVE2 for the Arm®v8 instruction set architecture allow for computer workloads to expand from workloads utilizing integer operations to also include workloads utilizing vector operations. Integer operations are performed by specifically designed integer circuits which execute integer instructions. Floating point operations and vector instructions operating on an array of operands are performed by specifically designed vector circuits which execute vector instructions. In executing instructions, integer and vector circuits utilize dedicated register files as local fast storage to hold one or more copies of architected registers to facilitate out-of-order processing of instructions and avoiding pipeline stalls.

SUMMARY

Aspects disclosed in the detailed description include a processing unit including a dynamically allocatable vector register file for non-vector instruction processing. The processing unit includes an integer execution circuit and integer register file for processing and executing integer instructions. The processing unit also includes a vector execution circuit and a vector register file for processing vector instructions. The integer and vector register files are each sized at design time according to anticipated tradeoffs in memory area and power consumption versus anticipated workloads. However, a processing unit may be called upon to execute varying workloads that vary between integer and vector operations. In this regard, in exemplary aspects, as opposed to statically allocating vector registers in the vector register file to the vector execution circuit, the processor is configured to dynamically allocate a portion(s) of the vector registers in the vector register file for use in the execution of integer instructions based on the relative workload of integer instructions versus vector instructions. The processing unit is also configured to dynamically reallocate the portion(s) of the vector registers in the vector register file back to the vector execution circuit. By advantageously allocating and reallocating the vector registers in the vector register file for integer instructions, the size of the integer vector file can be reduced or maintained while increasing throughput for heavy integer-based workloads.

In one aspect, an apparatus comprising a processing unit is disclosed. The processing unit comprises one or more non-vector processing circuits, a vector register file comprising a first portion designated for vector registers, and a queue buffer configured to receive a plurality of vector instructions. The processing unit is configured to determine a vector register requirement for execution of the plurality of vector instructions and, in response to determining that the vector register requirement for execution of the plurality of vector instructions is less than substantially all of the first portion designated for vector registers, allocate a first subset of the first portion designated for vector registers to the one or more non-vector processing circuits leaving a complement portion of the first portion designated for vector registers. The process unit executes the plurality of vector instructions.

In another aspect, method for dynamically allocating an adaptive vector register file is disclosed. The method comprises designating a first portion of a register file to vector registers, receiving a plurality of vector instructions, determining a vector register requirement for execution of the plurality of vector instructions and, in response to determining that the vector register requirement for execution of the plurality of vector instructions is less than substantially all of the first portion designated for vector registers, allocating a first subset of the first portion designated for vector registers to one or more non-vector processing circuits leaving a complement portion of the first portion designated for vector registers.

In another aspect, an apparatus is disclosed. The apparatus comprises a means for designating a first portion of a register file to vector registers, a means for designating a first portion of a register file to vector registers, means for determining a vector register requirement for execution of the plurality of vector instructions and, in response to determining that the vector register requirement for execution of the plurality of vector instructions is less than substantially all of the first portion designated for vector registers, means for allocating a first subset of the first portion designated for vector registers to one or more non-vector processing circuits, leaving a complement portion of the first portion designated for vector registers.

DETAILED DESCRIPTION

Figure 1:
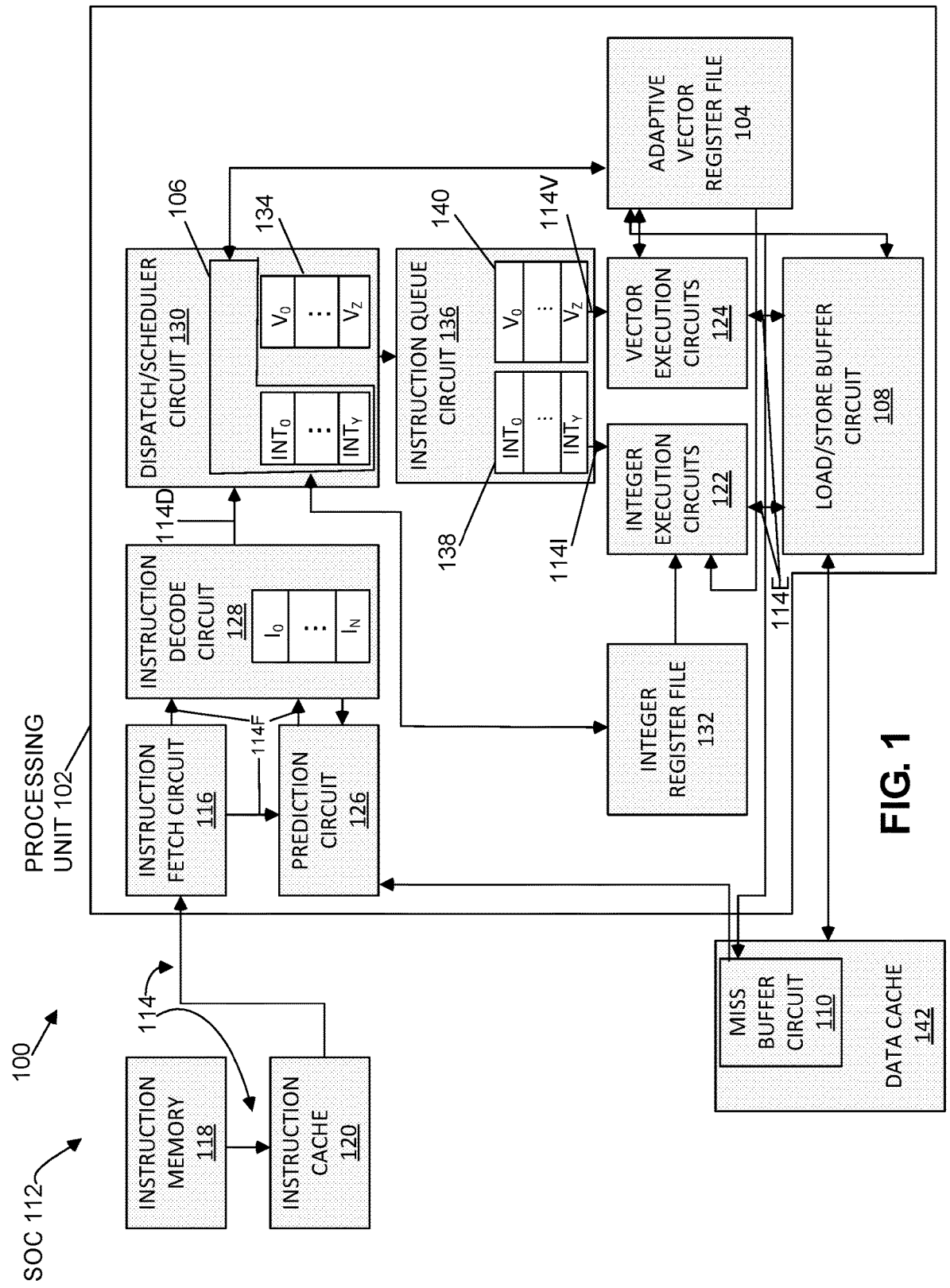
FIG. 1 is a block diagram of an exemplary processor-based system that includes a processing unit that includes a dynamically allocatable vector register file for non-vector instruction processing.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include a processing unit including a dynamically allocatable vector register file for non-vector processing. The processing unit includes an integer execution circuit and integer register file for processing and executing integer instructions. The processing unit also includes a vector execution circuit and a vector register file for processing vector instructions. The integer and vector register files are each sized at design time according to anticipated tradeoffs in memory area and power consumption versus anticipated workloads. However, a processing unit may be called upon to execute varying workloads that vary between integer and vector operations. In this regard, in exemplary aspects, as opposed to statically allocating vector registers in the vector register file to the vector execution circuit, the processor is configured to dynamically allocate a portion(s) of the vector registers in the vector register file for use in the execution of integer instructions based on the relative workload of integer instructions versus vector-instructions. The processing unit is also configured to dynamically reallocate the portion(s) of the vector registers in the vector register file back to the vector execution circuit as well. By advantageously allocating and reallocating the vector registers in the vector register file for integer instructions, the size of the integer vector file can be reduced or maintained while increasing throughput for heavy integer-based workloads.

Figure 2:
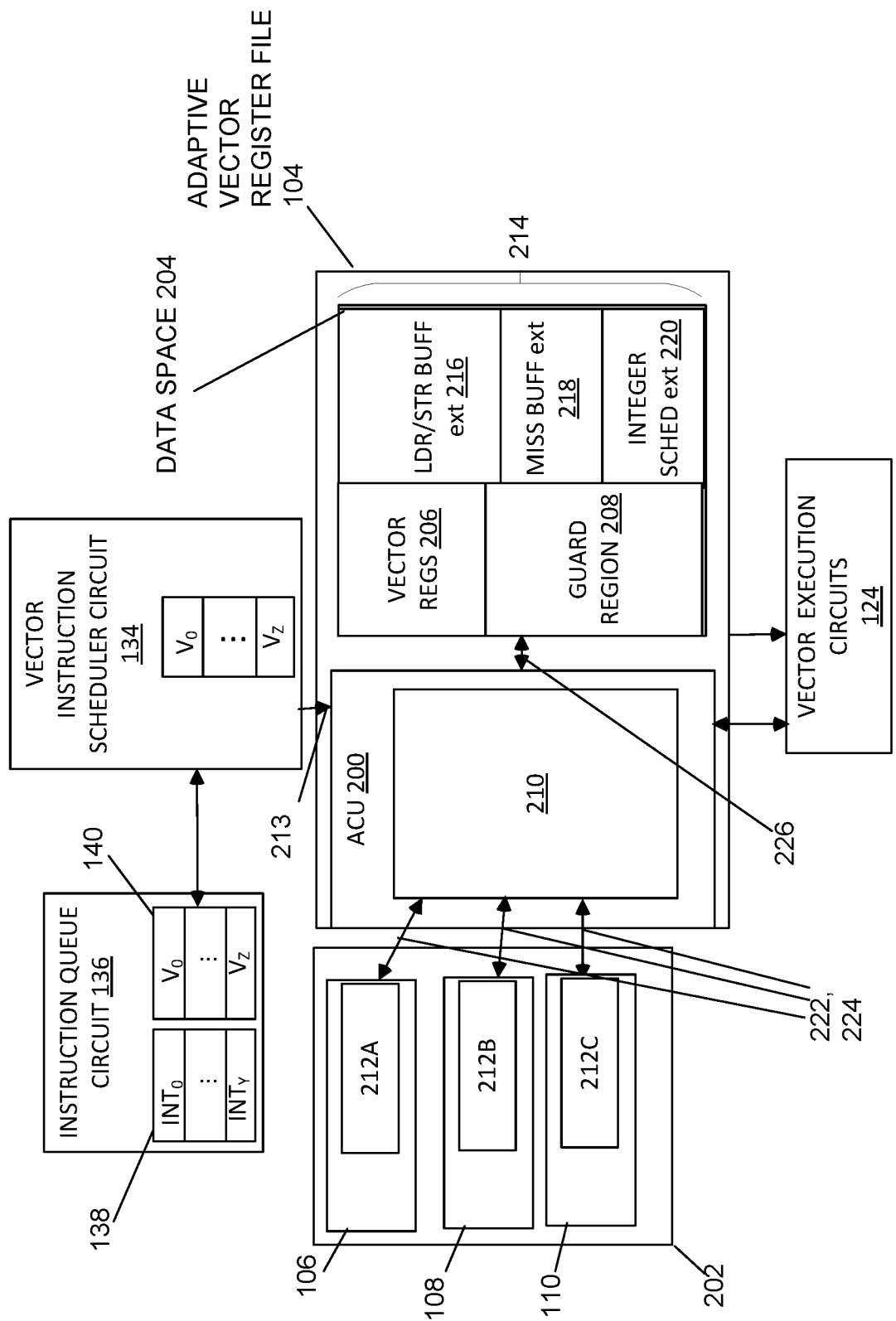
FIG. 2 is a block diagram of an exemplary dynamically allocatable vector register file for non-vector instruction processing.
Figure 3:
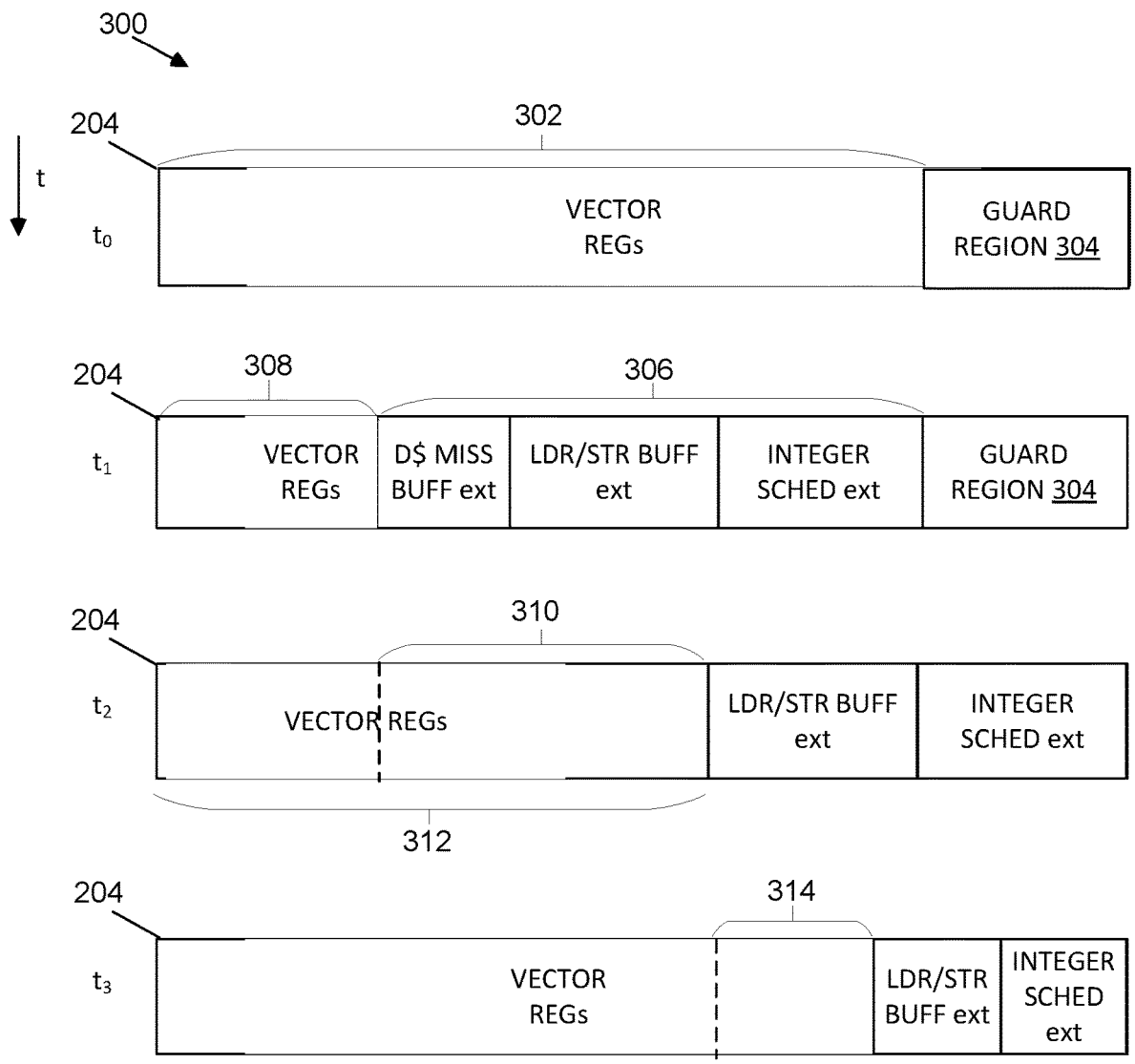
FIG. 3 is a timing diagram of an exemplary sequence of allocation and reallocation of vector registers in the data space of the dynamically allocatable vector register files discussed in FIGS. 1 and 2.
Figure 4:
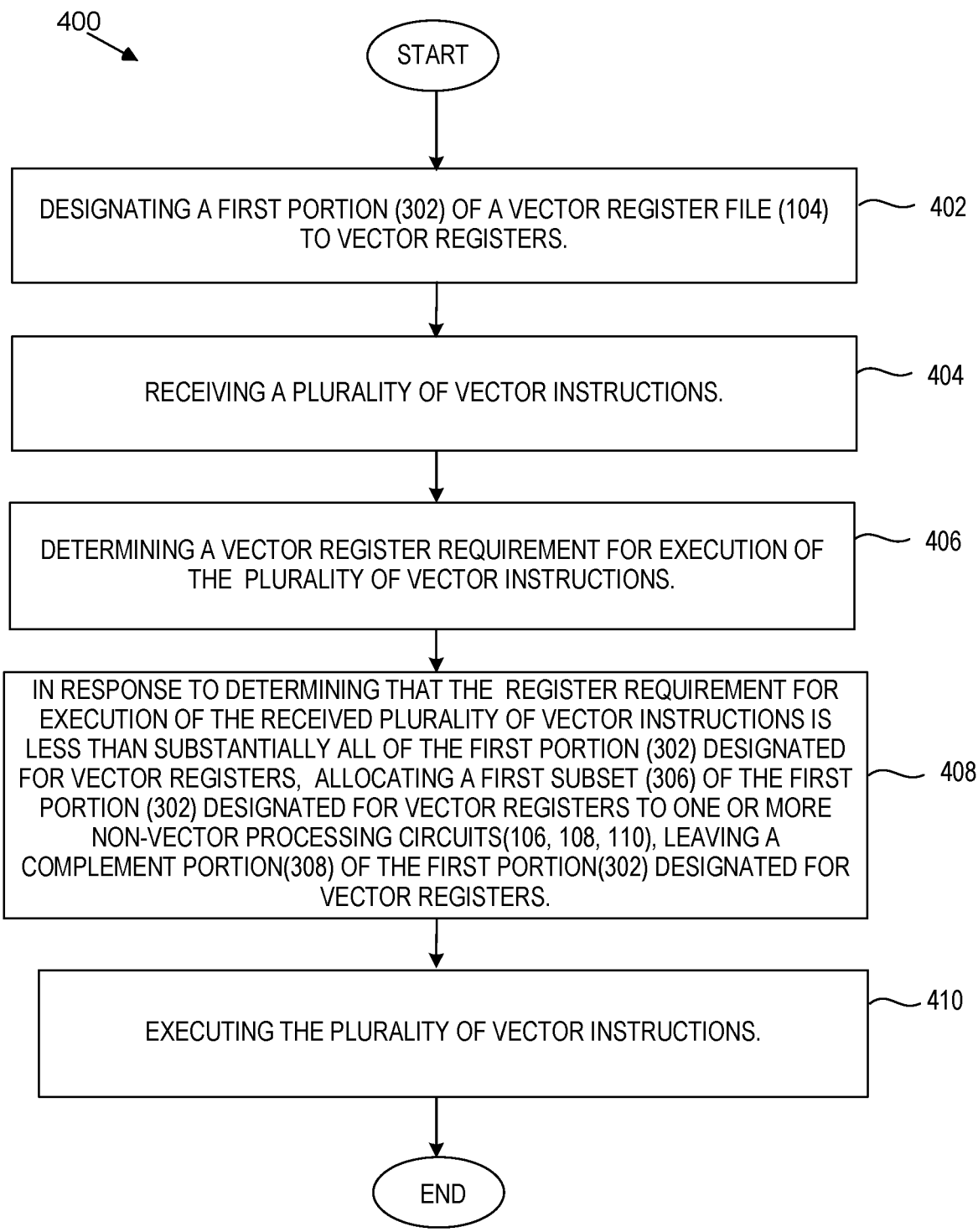
FIG. 4 is a flowchart illustrating an exemplary process for dynamically allocating a vector register file, including the dynamically allocatable adaptive vector register files of FIGS. 1 and 2.

In this regard, FIG. 1 is a block diagram of an exemplary processor-based system 100 that includes a processing unit 102 that includes a dynamically allocatable vector register file, also referred to as an adaptive vector register file, 104 for non-vector processing. As described in more detail below, the adaptive vector register file 104 is configured to dedicate a portion of the adaptive vector register file 104 to vector registers and allocate a subset of the dedicated portion of the adaptive vector register file 104 to one or more non-vector processing circuits. For example, non-vector processing circuits may include, but are not limited to, one or more circuits including an integer instruction scheduler circuit 106, a load/store buffer circuit 108 or a miss buffer circuit 110. A portion of the adaptive vector register file 104 may include the entire capacity of the adaptive vector register file 104. FIG. 2 describes in more detail the cooperation between the non-vector processing circuits and the adaptive vector register file 104 to utilize the subset of the dedicated portion of the adaptive vector register file 104 for non-vector processing operations. FIGS. 3-4 describe an exemplary operation of the adaptive vector register file 104 the processor-based system 100 in FIG. 1. Before describing the detailed cooperation between the non-vector processing circuits and the adaptive vector register file 104 in FIG. 1, other elements of the processing unit 102 in FIG. 1 are first described below.

The processing unit 102 may be provided in a system-on-a-chip (SoC) 112 as an example. In this regard, instructions 114 including integer and vector instructions are fetched by an instruction fetch circuit 116 from an instruction memory 118. The instruction memory 118 may be provided in or as part of a system memory in the processor-based system 100 as an example. An instruction cache 120 may also be provided in the processing unit 102 to cache the instructions 114 from the instruction memory 118 to reduce latency in the instruction fetch circuit 116 fetching the instructions 114. The instruction fetch circuit 116 is configured to provide the instructions 114 as fetched instructions 114F into one or more instruction pipelines $I_0$-$I_N$ in the processing unit 102 to be pre-processed, before the fetched instructions 114F reach an execution circuit, such as integer execution circuits 122 and vector execution circuits 124 in the processing unit 102 to be executed. The instruction pipelines $I_0$-$I_N$ are provided across different processing circuits or stages of the processing unit 102 to pre-process and process the fetched instructions 114F in a series of steps that are performed concurrently to increase throughput prior to execution of the fetched instructions 114F in the integer execution circuits 122 and the vector execution circuits 124.

With continuing reference to FIG. 1, a prediction circuit 126 (e.g., a branch prediction circuit) is also provided to speculate or predict a target address for a control flow fetched instruction 114F, such as a conditional branch instruction. The prediction of the target address by the prediction circuit 126 is used by the instruction fetch circuit 116 to determine the next fetched instructions 114F to fetch based on the predicted target address. An instruction decode circuit 128 is configured to decode the fetched instructions 114F fetched by the instruction fetch circuit 116 into decoded instructions 114D to determine the type of instructions 114 and actions required, which in turn is used to determine in which instruction pipeline $I_0$-$I_N$ the fetched instructions 114F should be placed.

With continuing reference to FIG. 1, in this example, the decoded instructions 114D are then placed in one or more of the instruction pipelines $I_0$-$I_N$ and are next provided to a dispatch and scheduler circuit 130. The dispatch and scheduler circuit 130 is configured to divide the decoded instructions 114D into an integer instruction pipeline including integer instructions $INT_o$-$INT_y$ and a vector instruction pipeline including vector instructions $V_o$-$V_z$. The dispatch and scheduler circuit 130 determines if any register names in the decoded instructions 114D need to be renamed to break any register dependencies that would prevent parallel or out-of-order processing of the instructions 114. The processing unit 102 in FIG. 1 can process the fetched instructions 114F out of order, if possible, to achieve greater throughput performance and parallelism. However, the number of logical (i.e., architectural) registers provided in the processing unit 102 are limited by the architected sizes of integer register file 132 and the adaptive vector register file 104.

In this regard, the dispatch and scheduler circuit 130 is configured to call upon a register map table (RMT) to rename a logical source register operand and/or write a destination register operand of an instruction 114 to available physical registers in a physical register file, such as the integer register file 132 or the adaptive vector register file 104. In particular, the integer instruction scheduler circuit 106 is configured to rename a logical source register operand and/or write a destination register operand of an integer instruction, such as the integer instructions $INT_o$-$INT_y$, in the integer register file 132. Also, a vector instruction scheduler circuit 134 is configured to rename a logical source register operand and/or write a destination register operand of a vector instruction, such as the vector instructions $V_o$-$V_z$, in the adaptive vector register file 104. In order for the integer instruction scheduler circuit 106 to track the renaming of registers, the integer instruction scheduler circuit 106 has access to a fixed amount of data space associated with scoreboarding techniques for tracking registers with their respective instructions. As will be discussed further in FIG. 2, if the adaptive vector register file 104 has allocated a subset of the first portion of the adaptive vector register file 104 initially designated to vector registers to the integer instruction scheduler circuit 106, the integer instruction scheduler circuit 106 may expand its fixed amount of data space for scoreboarding to additionally rename a logical source register operand and/or write a destination register operand of an integer instruction in the adaptive vector register file 104 advantageously providing support for instruction workloads that are more heavily integer instruction focused.

It may be desired to provide for the processing unit 102 in FIG. 1 to have visibility to a large number of future instructions 114 (i.e., an instruction window) in order to extract a larger number of instructions 114 that can be executed independently, out of order for increased performance.

In this regard, the dispatch and scheduler circuit 130 is configured to provide the retrieved produced value from an executed instruction 114E as the source register operand of an instruction 114 to be executed. The dispatch and scheduler circuit 130 is configured to dispatch the decoded instruction 114D to an instruction queue circuit 136 to await dispatch to either the integer execution circuits 122 or the vector execution circuits 124 to be executed when all source register operands for the decoded instruction 114D are available. The instruction queue circuit 136 includes a queue buffer 138 which is configured to receive one or more integer instructions and a queue buffer 140 which is configured to receive one or more vector instructions. The vector instruction scheduler circuit 134 is configured to analyze the vector instructions in the queue buffer 140, such as the vector instructions $V_o$-$V_z$, to determine whether the vector instructions in the vector instruction queue buffer 140 require, for execution, substantially all of the first portion of the adaptive vector register file 104 designated to vector registers. If it does not, the vector instruction scheduler circuit 134 allocates a first subset of the first portion designated for vector registers to one or more non-vector processing circuits. The complement portion of the first portion designated for vector registers remains designated for vector registers. The one or more non-vector processing circuits include the integer instruction scheduler circuit 106, the load/store buffer circuit 108, and the miss buffer circuit 110.

The integer execution circuits 122 execute one or more integer instructions, such as the integer instructions $INT_o$-$INT_y$ 114I from the integer instruction queue buffer 138 when the source register operands are available. Similarly, the vector execution circuits 124 execute one or more vector instructions 114V, such as the vector instructions $V_o$-$V_z$, from the vector instruction queue buffer 140 when the source register operands are available and execute the received vector instructions. The load/store buffer circuit 108 receives the results of the executed instructions 114E and writes back the results to memory including a data cache 142 for use by subsequent instructions. The load/store buffer circuit 108 has a fixed amount of space to store the results of executed instructions 114E. However, if the adaptive vector register file 104 has allocated a subset of the first portion of the adaptive vector register file 104 initially designated to vector registers to the load/store buffer circuit 108, the load/store buffer circuit 108 may additionally store more results of executed instructions 114E in the adaptive vector register file 104 advantageously increasing the capacity of the space that is initially fixed at design time in the load/store buffer circuit 108. As a result, increasing the capacity of the load/store buffer circuit 108 by utilizing the adaptive vector register file 104 provides capability to store and retrieve more data from local buffers than accessing them from relatively slower cache memory. This advantageous dynamic increase in capacity results in increased performance for load and store memory instructions, which are inherently relatively slow due to memory access time. The increased capacity leads to quicker dependency resolutions and, in general, benefits all workloads that are more heavily integer instruction focused.

The load/store buffer circuit 108 is also configured to load data from the data cache 142 in response to executing an instruction 114E. The data cache 142 includes the miss buffer circuit 110 to temporarily store addresses of data retrieved from system memory that was not in the data cache 142 when requested (i.e., cache miss) from the load/store buffer circuit 108. The addresses stored in the miss buffers are analyzed to check for patterns between the addresses that resulted in a cache miss. Those patterns are fed back to the prediction circuit 126 to enhance predictively prefetching instructions. The miss buffer circuit 110 has a capacity that is fixed at design time. However, if the adaptive vector register file 104 has allocated a subset of the first portion of the adaptive vector register file 104 initially designated to vector registers to the miss buffer circuit 110, the capacity of the miss buffer circuit 110 advantageously increases to allow for detection of more complex memory request patterns and to prefetch them in advance to the cache memory before the instructions requests for it and reducing the cache memory misses and longer waiting time, thereby increasing throughput of the processing unit 102.

FIG. 2 is a block diagram of an exemplary dynamically allocatable vector register file, for example, the adaptive vector register file 104 in FIG. 1, for non-vector processing. Common elements between the processing unit 102 in FIG. 1 and elements of a portion of the processing unit 102 in FIG. 2 are shown with common element numbers. The adaptive vector register file 104 includes an adaptive control unit 200 for interfacing with the extension circuitry of non-vector processing circuits 202 and data space 204 which includes a first portion designated for vector registers 206 and, as shown in FIG. 2, has been allocated to extend the fixed design capacity for the non-vector processing circuits 202 including, but not limited to, the integer instruction scheduler circuit 106, the load/store buffer circuit 108, and the miss buffer circuit 110. Optionally, the data space 204 may include a guard region 208 to help with allocating and reallocating the first portion designated for vector registers to and from the non-vector processing circuits 202. The adaptive control unit 200 includes a configuration and decode circuit 210 which communicates with individual extension circuits 212A-212C associated with each of the non-vector processing circuits 202. Optionally, there may be one extension circuit shared between all the non-vector processing circuits 202 as well as individual configuration and decode circuits interfacing with the individual extension circuits 212A-212C.

In operation, the vector instruction scheduler circuit 134 analyzes the queue buffer 140 and determines a vector register requirement for executing the vector instructions $V_o$-$V_z$. The vector instruction scheduler circuit 134 communicates 213 the determined requirements to the adaptive control unit 200. In response to the adaptive control unit 200 determining that the vector register requirement for executing the vector instructions $V_o$-$V_z$ is less than substantially all of the first portion designated to vector registers, the configuration and decode circuit 210 is configured to allocate a subset 214 of the first portion designated to vector registers to one or more non-vector processing circuits 202 such as portion 216 of data space 204 allocated to an extension of static data space associated with the Load/Store buffer circuit 108, portion 218 of data space 204 allocated to an extension of static data space associated with the miss buffer circuit 110, and portion 220 of data space 204 allocated to an extension of static data space associated with the integer scheduler circuit 106. The configuration and decode circuit 210 may be configured using various algorithms based on the minimum extension capacity for each non-vector processing circuit 202, and the size of the subset 214 may be used to determine how much of the subset 214 is apportioned to the one or more non-vector processing circuits 202. The configuration and decode circuit 210, based on allocating the subset 214 to the non-vector processing circuits 202, configures its decoding circuitry to map addresses allocated to the individual non-vector processing circuits 202 to specific locations in the allocated subset. The configuration and decode circuit 210, based on the remaining portion, also referred to as the complement portion, of the first portion designated to vector registers, configures its decoding circuitry to map addresses of vector registers to the remaining portion. The configuration and decode circuit 210 communicates 222 to the extension circuits 212A-212C a memory map for each non-vector processing circuit 202 for the allocated subset designated to each non-vector processing circuit 202, respectively. When a read or write request arrives from non-vector processing circuits, the extension circuits 212A-212C forwards the request if it falls within the memory map to the configuration and decode circuit 210 where appropriate translation and boundary checks are done to enable accurate and safe access to allocation of subset 214.

Once communicated, the extension circuits 212A-212C configure themselves respectively to send memory address requests 224 (e.g., read or write requests) that fall within the communicated memory map for data to the configuration and decode circuit 210. For example, the integer instruction scheduler circuit 106 may have been allocated one kilobyte (1 KB) of data space whose memory addresses are 0x0000 . . . 0x03E8 in the subset allocated to the non-vector processing circuits 202. If the integer instruction scheduler circuit 106 processes a memory address that falls within that memory range, rather than using its usual defined memory source to resolve the data location for the memory address, the extension circuit 212A will communicate with the configuration and decode circuit 210 of the adaptive control unit 200 to retrieve data 226 from the allocated 1 KB of data space in the subset 214 of the adaptive vector register file 104. The previously described operation is similar for the load/store buffer circuit 108 and the miss buffer circuit 110 varying mainly with the specific address region mapped for those specific non-vector processing circuits 202. Reallocation operations of the extension circuits 212A-212C and the adaptive vector register file 104 will be discussed with reference to FIG. 3.

FIG. 3 is a timing diagram 300 of an exemplary sequence of allocation and reallocation of vector registers in the data space 204 of the dynamically allocatable vector register file, such as the adaptive vector register file 104 discussed in FIGS. 1 and 2. At time $t_0$, the data space 204 includes a first portion 302 designated to vector registers and an optional guard region 304. The optional guard region 304 is not designated for vector registers or non-vector processing circuits. At time $t_1$, the data space 204 is shown to reflect that the vector instruction scheduler circuit 134 has analyzed the queue buffer 140 and has determined the vector register requirement for executing the vector instructions $V_o$-$V_z$, the adaptive control unit 200 has determined that the vector register requirement for executing the vector instructions in the queue buffer 140 is less than substantially all of the first portion 302 designated to vector registers, and the configuration and decode circuit 210 has allocated a subset 306 of the first portion 302 designated to vector registers to one or more non-vector processing circuits, leaving the complement portion 308 of the first portion 302 to be utilized for vector registers. At time $t_2$, the data space 204 is shown to reflect that the vector instruction scheduler circuit 134 has analyzed the queue buffer 140 and has determined the vector register requirement for executing the vector instructions, the adaptive control unit 200 has determined that the vector register requirement for executing the vector instructions in the queue buffer 140 is more than the complement portion 308 at time $t_1$ designated to vector registers, and the configuration and decode circuit 210 has reallocated a second portion 310 of the subset 306 back to vector registers and allocated the guard region 304 to vector registers. If the optional guard region 304 is not configured, the adaptive control unit 200 may be configured to reallocate portions of the data space 204 allocated to other non-vector processing circuits shown at $t_1$. In this example, the second portion 310 was previously allocated to the miss buffer circuit 110 and the load/store buffer circuit 108. The data space 204 previously allocated to the miss buffer circuit 110 in the second portion 310 as well as the guard region 304 can be immediately recaptured for use by the vector execution circuits 124.

At time $t_3$, the data space 204 is shown to reflect that the vector instruction scheduler circuit 134 has analyzed the queue buffer 140 and has determined the vector register requirement for executing the vector instructions, the adaptive control unit 200 has determined that the vector register requirement for executing the vector instructions in the queue buffer 140 is more than the portion 312 at time $t_2$ designated to vector registers, and the configuration and decode circuit 210 has reallocated a third portion 314 of the subset 306 back to vector registers. In this example, the third portion 314 was previously allocated to the load/store buffer circuit 108 and the integer instruction scheduler circuit 106. The data space 204 previously allocated to the load/store buffer circuit 108 and the integer instruction scheduler circuit 106 can be recaptured for vector registers after the load/store buffer circuit 108 and the integer instruction scheduler circuit 106 have completed use of their respective data. For example, the load/store buffer circuit 108 will release its respective portion of data space 204 for recapture as its respective data is written to the data cache 142. The integer instruction scheduler circuit 106, for example, will release its respective portion of data space 204 for recapture as the integer instruction scheduler circuit 106 completes processing of the associated integer instruction(s). Since the portion of data space 204 allocated to the miss buffer circuit 110 can be immediately recaptured while the portion of data space 204 allocated to other non-vector processing circuits 202 is recaptured only after those non-vector processing circuits 202 have completed use of their data, the adaptive control unit 200 may prioritize reallocating data space 204 allocated to the miss buffer circuit 110 before reallocating data space 204 allocated to either the load/store buffer circuit 108 or the integer instruction scheduler circuit 106. Given that the arrival rate of vector instructions may be random, the adaptive control unit 200 may be additionally configured to utilize a guard region 304 to address instances where the arrival rate of vector instructions is faster than the rate at which the adaptive control unit 200 recaptures data space 204 from the data allocated to non-vector processing circuits.

FIG. 4 is a flowchart illustrating an exemplary process 400 for dynamically allocating a vector register file, including the dynamically allocatable adaptive vector register file 104 of FIGS. 1 and 2. In this regard, a first exemplary step in the process 400 of FIG. 4 can include designating a first portion 302 of a vector register file 104 to vector registers (block 402). A next step in the process 400 can include receiving a plurality of vector instructions (block 404). A next step in the process 400 can include determining a vector register requirement for execution of the plurality of vector instructions (block 406). For example, the register file, such as adaptive vector register file 104, may have a fixed size of 128K bits. This size would accommodate eight copies of 32 vector registers, each having 512 bits. An exemplary register requirement for the plurality of vector registers may only require 16K bits or one copy of the 32 registers leaving 112K bits unused when executing the plurality of vector registers. A next step in process 400 can include, in response to determining that the vector register requirement for execution is less than substantially all of the first portion 302 designated for vector registers, allocating a first subset 306 of the first portion 302 designated for vector registers to one or more non-vector processing circuits (106, 108, 110), leaving a complement portion 308 of the first portion 302 designated for vector registers (block 408). Continuing with the previous example, the 112K would be allocated to the non-vector processing circuits while 16K bits will continue to be used for vector registers. A next step in process 400 can include executing the plurality of vector instructions (block 410).

Electronic devices that include a processing unit including a dynamically allocatable vector register file for non-vector instruction processing as described in FIGS. 1-3 and according to, but not limited to, any of the exemplary processes such as process 400 in FIG. 4, and according to any aspects disclosed herein, may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, laptop computer, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, an avionics system, and a multicopter.

Figure 5:
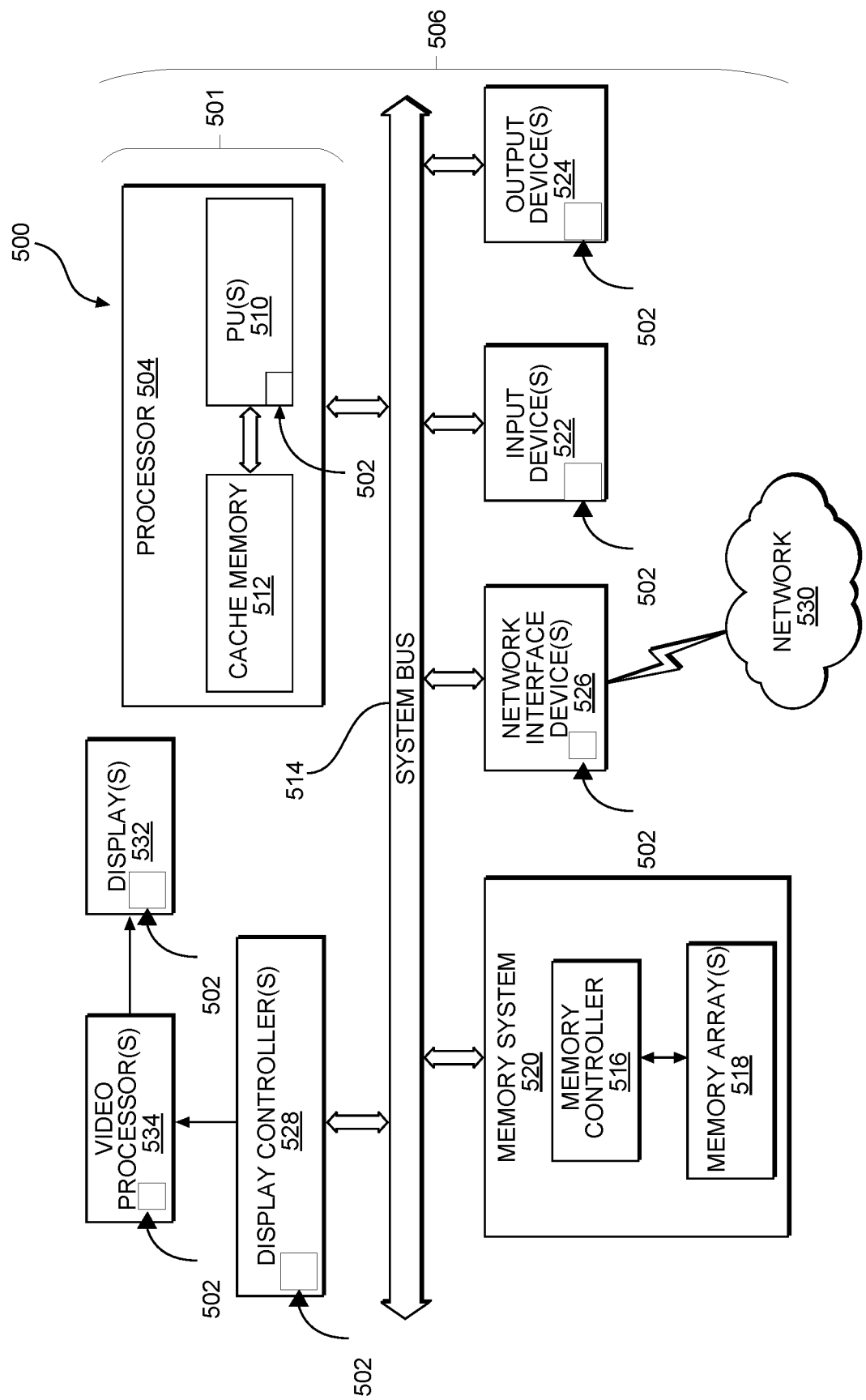
FIG. 5 is a block diagram of an exemplary processor-based system that can include a dynamically allocatable vector register file, including the dynamically allocatable adaptive vector register files in FIGS. 1 and 2 and according to, but not limited to, the exemplary process in FIG. 4.

In this regard, FIG. 5 illustrates an example of a processor-based system 500 that can include a dynamically allocatable vector register file, including the dynamically allocatable adaptive vector register file in FIGS. 1 and 2 and according to, but not limited to, the exemplary process in FIG. 4 and according to any exemplary aspects disclosed herein. In this example, the processor-based system 500 may be formed as an IC 501 and include a dynamically allocatable vector register file 502, such as the adaptive vector register file 104, and as a system-on-a-chip (SoC) 506. The processor-based system 500 includes a processor 504 that includes one or more processing units (PUs) 510, which may also be referred to as PU cores or processor cores. The PU(s) 510 may have cache memory 512 coupled to the PU(s) 510 for rapid access to temporarily stored data. The PU(s) 510 is coupled to a system bus 514 and can intercouple master and slave devices included in the processor-based system 500. As is well known, the PU(s) 510 communicates with these other devices by exchanging address, control, and data information over the system bus 514. For example, the PU(s) 510 can communicate bus transaction requests to a memory controller 516, as an example of a slave device. Although not illustrated in FIG. 5, multiple system buses 514 could be provided, wherein each system bus 514 constitutes a different fabric.

Other master and slave devices can be connected to the system bus 514. As illustrated in FIG. 5, these devices can include a memory system 520 that includes the memory controller 516 and a memory array(s) 518, one or more input devices 522, one or more output devices 524, one or more network interface devices 526, and one or more display controllers 528, as examples. Each of the memory system(s) 520, the one or more input devices 522, the one or more output devices 524, the one or more network interface devices 526, and the one or more display controllers 528 can be provided in the same or different electronic devices. The input device(s) 522 can include any type of input device, including, but not limited to, input keys, switches, voice processors, etc. The output device(s) 524 can include any type of output device, including, but not limited to, audio, video, other visual indicators, etc. The network interface device(s) 526 can be any device configured to allow exchange of data to and from a network 530. The network 530 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 526 can be configured to support any type of communications protocol desired.

The PU(s) 510 may also be configured to access the display controller(s) 528 over the system bus 514 to control information sent to one or more displays 532. The display controller(s) 528 sends information to the display(s) 532 to be displayed via one or more video processors 534, which process the information to be displayed into a format suitable for the display(s) 532. The display controller(s) 528 and video processor(s) 534 can be included as ICs in the same or different electronic devices containing the PU(s) 510 and dynamically allocatable vector register file(s) 502, as an example. The display(s) 532 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium wherein any such instructions are executed by a processor or other processing device, or combinations of both. The devices and components described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

Implementation examples are described in the following numbered clauses:

1. An apparatus, comprising:
    a processing unit comprising:
        one or more non-vector processing circuits;
        a vector register file comprising:
            a first portion designated for vector registers; and
            a queue buffer configured to receive a plurality of vector instructions;
    the processing unit configured to:
        determine a vector register requirement for execution of the plurality of vector instructions;
        in response to determining that the vector register requirement for execution of the plurality of vector instructions is less than substantially all of the first portion designated for the vector registers, allocate a first subset of the first portion designated for the vector registers to the one or more non-vector processing circuits leaving a complement portion of the first portion designated for the vector registers; and
        execute the plurality of vector instructions.

2. The apparatus of clause 1, wherein the processing unit is further configured, in response to determining that that the vector register requirement for execution of the plurality of vector instructions is more than the complement portion of the first portion designated for the vector registers, to:
    reallocate a second portion of the first subset to the vector registers.

3. The apparatus of clause 1 or 2, wherein the vector register file further comprises a guard region not dedicated to either the vector registers or the one or more non-vector processing circuits.

4. The apparatus of any of clauses 1-3, wherein the one or more non-vector processing circuits include one or more circuits selected from a group consisting of an integer instruction scheduler circuit, a load/store buffer circuit, and a miss buffer circuit.

5. The apparatus of clause 2, wherein the one or more non-vector processing circuits comprises:
    a miss buffer circuit;
    a load/store buffer circuit; and
    an integer instruction scheduler circuit,
    wherein the processing unit configured to reallocate the second portion of the first subset to the vector registers is further configured to:
        reallocate the second portion of the first subset which was allocated to the miss buffer circuit.

6. The apparatus of clause 2, wherein the one or more non-vector processing circuits comprises:
    a miss buffer circuit;
    a load/store buffer circuit; and
    an integer instruction scheduler circuit, wherein the processing unit configured to reallocate the second portion of the first subset to the vector registers is further configured to:
    reallocate the second portion of the first subset which was allocated to the miss buffer circuit and the load/store buffer circuit.

7. The apparatus of clause 2, wherein the one or more non-vector processing circuits comprises:
a miss buffer circuit;
a load/store buffer circuit; and
an integer instruction scheduler circuit,
wherein the processing unit configured to reallocate the second portion of the first subset to the vector registers is further configured to:
    reallocate the second portion of the first subset which was allocated to the miss buffer circuit, the load/store buffer circuit, and the integer instruction scheduler circuit.

8. The apparatus of any of clauses 1-7, further comprising:
an integer register file; and
an integer execution circuit configured to execute integer instructions utilizing the first subset of the first portion and the integer register file.

9. The apparatus of clause 8, further comprising a vector execution circuit configured to execute a vector instruction of the plurality of vector instructions from the queue buffer utilizing the complement portion of the first portion designated for the vector registers.

10. A method for dynamically allocating an adaptive vector register file, comprising:
designating a first portion of a vector register file to vector registers;
receiving a plurality of vector instructions;
determining a vector register requirement for execution of the plurality of vector instructions; and
in response to determining that the vector register requirement for execution of the plurality of vector instructions is less than substantially all of the first portion designated for the vector registers, allocating a first subset of the first portion designated for the vector registers to one or more non-vector processing circuits, leaving a complement portion of the first portion designated for the vector registers.

11. The method of clause 10, further comprising, in response to determining that that the vector register requirement for execution of the plurality of vector instructions is more than the complement portion of the first portion designated for the vector registers, reallocating a second portion of the first subset to the vector registers.

12. The method of clause 10 or 11, wherein the vector register file comprises a guard region not dedicated to either the vector registers or the one or more non-vector processing circuits.

13. The method of any of clauses 10-12, wherein the one or more non-vector processing circuits include one or more circuits selected from a group consisting of an integer instruction scheduler circuit, a load/store buffer circuit, and a miss buffer circuit.

14. The method of clause 11, wherein allocating the first subset of the first portion designated for the vector registers to the one or more non-vector processing circuits further comprises:
    allocating the first subset of the first portion designated for the vector registers to a load/store buffer circuit, an integer instruction scheduler circuit, and a miss buffer circuit; and
wherein reallocating the second portion of the first subset to the vector registers further comprises:
    recapturing data space which was previously allocated to the miss buffer circuit.

15. The method of clause 11, wherein allocating the first subset of the first portion designated for the vector registers to the one or more non-vector processing circuits further comprises:
    allocating the first subset of the first portion designated for the vector registers to a load/store buffer circuit, an integer instruction scheduler circuit, and a miss buffer circuit; and
wherein reallocating the second portion of the first subset to the vector registers further comprises:
    recapturing data space which was previously allocated to the miss buffer circuit and the load/store buffer circuit.

16. The method of clause 11, wherein allocating the first subset of the first portion designated for the vector registers to the one or more non-vector processing circuits further comprises:
    allocating the first subset of the first portion designated for the vector registers to a load/store buffer circuit and an integer instruction scheduler circuit; and
wherein reallocating the second portion of the first subset to the vector registers further comprises:
    recapturing data space which was previously allocated to the load/store buffer circuit.

17. The method of any of clauses 10-16, further comprising executing integer instructions utilizing the first subset of the first portion and an integer register file.

18. An apparatus, comprising:
means for designating a first portion of a vector register file to vector registers;
means for determining a vector register requirement for execution of a plurality of vector instructions; and
in response to determining that the vector register requirement for execution of the plurality of vector instructions is less than substantially all of the first portion designated for the vector registers, means for allocating a first subset of the first portion designated for the vector registers to one or more non-vector processing circuits, leaving a complement portion of the first portion designated for the vector registers.

19. The apparatus of clause 18, further comprising, in response to determining that that the vector register requirement for execution of the plurality of vector instructions is more than the complement portion designated for the vector registers, means for reallocating a second portion of the first subset to the vector registers.

20. The apparatus of clause 18 or 19, wherein the vector register file comprises a guard region not dedicated to either the vector registers or the one or more non-vector processing circuits.

21. The apparatus of any of clauses 18-20, wherein the one or more non-vector processing circuits include one or more circuits selected from a group consisting of an integer instruction scheduler circuit, a load/store buffer circuit, and a miss buffer circuit.

22. The apparatus of clause 19, wherein the means for allocating the first subset of the first portion designated for the vector registers to the one or more non-vector processing circuits further comprises:
    means for allocating the first subset of the first portion designated for the vector registers to a load/store buffer circuit, an integer instruction scheduler circuit, and a miss buffer circuit; and wherein the means for reallocating the second portion of the first subset to the vector registers further comprises:
means for reclaiming data space which was previously allocated to the miss buffer circuit.

23. The apparatus of clause 19, wherein the means for allocating the first subset of the first portion designated for the vector registers to the one or more non-vector processing circuits further comprises:
means for allocating the first subset of the first portion designated for the vector registers to a load/store buffer circuit, an integer instruction scheduler circuit, and a miss buffer circuit; and
wherein the means for reallocating the second portion of the first subset to the vector registers further comprises:
means for reclaiming data space which was previously allocated to the miss buffer circuit and the load/store buffer circuit.

24. The apparatus of clause 19, wherein the means for allocating the first subset of the first portion designated for the vector registers to the one or more non-vector processing circuits further comprises:
means for allocating the first subset of the first portion designated for the vector registers to a load/store buffer circuit and an integer instruction scheduler circuit; and
wherein the means for reallocating the second portion of the first subset to the vector registers further comprises:
means for reclaiming data space which was previously allocated to the load/store buffer circuit.

25. The apparatus of any of clauses 18-24, further comprising means for executing integer instructions utilizing the first subset of the first portion and an integer register file.

What is claimed is:

1. An apparatus, comprising:
a processing unit comprising:
one or more non-vector processing circuits;
a vector register file comprising:
a first portion designated for vector registers; and
a queue buffer configured to receive a plurality of vector instructions;
the processing unit configured to:
determine a vector register requirement for execution of the plurality of vector instructions;
in response to determining that the vector register requirement for execution of the plurality of vector instructions is less than substantially all of the first portion designated for the vector registers, allocate a first subset of the first portion designated for the vector registers to the one or more non-vector processing circuits leaving a complement portion of the first portion designated for the vector registers;
execute the plurality of vector instructions; and
in response to determining that that the vector register requirement for execution of the plurality of vector instructions is more than the complement portion of the first portion designated for the vector registers, reallocate a second portion of the first subset to the vector registers,
wherein the one or more non-vector processing circuits comprises:
a miss buffer circuit;
a load/store buffer circuit; and
an integer instruction scheduler circuit, and
wherein the processing unit configured to reallocate the second portion of the first subset to the vector registers is further configured to:
reallocate the second portion of the first subset which was allocated to the miss buffer circuit.

2. The apparatus of claim 1, wherein the vector register file further comprises a guard region not dedicated to either the vector registers or the one or more non-vector processing circuits.

3. The apparatus of claim 1, wherein the one or more non-vector processing circuits include one or more circuits selected from a group consisting of an integer instruction scheduler circuit, a load/store buffer circuit, and a miss buffer circuit.

4. The apparatus of claim 1, wherein the one or more non-vector processing circuits comprises:
a miss buffer circuit;
a load/store buffer circuit; and
an integer instruction scheduler circuit,
wherein the processing unit configured to reallocate the second portion of the first subset to the vector registers is further configured to:
reallocate the second portion of the first subset which was allocated to the miss buffer circuit and the load/store buffer circuit.

5. The apparatus of claim 1, wherein the one or more non-vector processing circuits comprises:
a miss buffer circuit;
a load/store buffer circuit; and
an integer instruction scheduler circuit,
wherein the processing unit configured to reallocate the second portion of the first subset to the vector registers is further configured to:
reallocate the second portion of the first subset which was allocated to the miss buffer circuit, the load/store buffer circuit, and the integer instruction scheduler circuit.

6. The apparatus of claim 1, further comprising:
an integer register file; and
an integer execution circuit configured to execute integer instructions utilizing the first subset of the first portion and the integer register file.

7. The apparatus of claim 6, further comprising a vector execution circuit configured to execute a vector instruction of the plurality of vector instructions from the queue buffer utilizing the complement portion of the first portion designated for the vector registers.

8. A method for dynamically allocating an adaptive vector register file, comprising:
designating a first portion of a vector register file to vector registers;
receiving a plurality of vector instructions;
determining a vector register requirement for execution of the plurality of vector instructions;
in response to determining that the vector register requirement for execution of the plurality of vector instructions is less than substantially all of the first portion designated for the vector registers, allocating a first subset of the first portion designated for the vector registers to one or more non-vector processing circuits, leaving a complement portion of the first portion designated for the vector registers; and
in response to determining that that the vector register requirement for execution of the plurality of vector instructions is more than the complement portion of the first portion designated for the vector registers, reallocating a second portion of the first subset to the vector registers,
wherein allocating the first subset of the first portion designated for the vector registers to
the one or more non-vector processing circuits further comprises:

allocating the first subset of the first portion designated for the vector registers to a load/store buffer circuit, an integer instruction scheduler circuit, and a miss buffer circuit; and wherein reallocating the second portion of the first subset to the vector registers further comprises:
recapturing data space which was previously allocated to the miss buffer circuit.

9. The method of claim 8, wherein the vector register file comprises a guard region not dedicated to either the vector registers or the one or more non-vector processing circuits.

10. The method of claim 8, wherein the one or more non-vector processing circuits include one or more circuits selected from a group consisting of an integer instruction scheduler circuit, a load/store buffer circuit, and a miss buffer circuit.

11. The method of claim 8, wherein allocating the first subset of the first portion designated for the vector registers to the one or more non-vector processing circuits further comprises:
allocating the first subset of the first portion designated for the vector registers to a load/store buffer circuit, an integer instruction scheduler circuit, and a miss buffer circuit; and
wherein reallocating the second portion of the first subset to the vector registers further comprises:
recapturing data space which was previously allocated to the miss buffer circuit and the load/store buffer circuit.

12. The method of claim 8, wherein allocating the first subset of the first portion designated for the vector registers to the one or more non-vector processing circuits further comprises:
allocating the first subset of the first portion designated for the vector registers to a load/store buffer circuit and an integer instruction scheduler circuit; and
wherein reallocating the second portion of the first subset to the vector registers further comprises:
recapturing data space which was previously allocated to the load/store buffer circuit.

13. The method of claim 8, further comprising executing integer instructions utilizing the first subset of the first portion and an integer register file.

14. An apparatus, comprising:
means for designating a first portion of a vector register file to vector registers;
means for determining a vector register requirement for execution of a plurality of vector instructions;
in response to determining that the vector register requirement for execution of the plurality of vector instructions is less than substantially all of the first portion designated for the vector registers, means for allocating a first subset of the first portion designated for the vector registers to one or more non-vector processing circuits, leaving a complement portion of the first portion designated for the vector registers; and in response to determining that that the vector register requirement for execution of the plurality of vector instructions is more than the complement portion designated for the vector registers, means for reallocating a second portion of the first subset to the vector registers, wherein the means for allocating the first subset of the first portion designated for the vector registers to the one or more non-vector processing circuits further comprises:
means for allocating the first subset of the first portion designated for the vector registers to a load/store buffer circuit, an integer instruction scheduler circuit, and a miss buffer circuit; and
wherein the means for reallocating the second portion of the first subset to the vector registers further comprises:
means for reclaiming data space which was previously allocated to the miss buffer circuit.

15. The apparatus of claim 14, wherein the vector register file comprises a guard region not dedicated to either the vector registers or the one or more non-vector processing circuits.

16. The apparatus of claim 14, wherein the one or more non-vector processing circuits include one or more circuits selected from a group consisting of an integer instruction scheduler circuit, a load/store buffer circuit, and a miss buffer circuit.

17. The apparatus of claim 14, wherein the means for allocating the first subset of the first portion designated for the vector registers to the one or more non-vector processing circuits further comprises:
means for allocating the first subset of the first portion designated for the vector registers to a load/store buffer circuit, an integer instruction scheduler circuit, and a miss buffer circuit; and
wherein the means for reallocating the second portion of the first subset to the vector registers further comprises:
means for reclaiming data space which was previously allocated to the miss buffer circuit and the load/store buffer circuit.

18. The apparatus of claim 14, wherein the means for allocating the first subset of the first portion designated for the vector registers to the one or more non-vector processing circuits further comprises:
means for allocating the first subset of the first portion designated for the vector registers to a load/store buffer circuit and an integer instruction scheduler circuit; and
wherein the means for reallocating the second portion of the first subset to the vector registers further comprises:
means for reclaiming data space which was previously allocated to the load/store buffer circuit.

19. The apparatus of claim 14, further comprising means for executing integer instructions utilizing the first subset of the first portion and an integer register file.

* * * * *